United States Patent
Noritake

(10) Patent No.: US 6,990,992 B2
(45) Date of Patent: Jan. 31, 2006

(54) DAMPER DEVICE

(75) Inventor: Seiichiro Noritake, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 256 days.

(21) Appl. No.: 10/627,959

(22) Filed: Jul. 25, 2003

(65) Prior Publication Data

US 2004/0147219 A1    Jul. 29, 2004

(30) Foreign Application Priority Data

Aug. 12, 2002 (JP) .............................. 2002-235108

(51) Int. Cl.
*F16K 11/052* (2006.01)
(52) U.S. Cl. .......................... 137/1; 137/865; 137/870; 137/875
(58) Field of Classification Search ................ 137/862, 137/865 X, 870 X, 875 X, 595, 597, 607, 137/601.11, 1 I
See application file for complete search history.

(56) References Cited

U.S. PATENT DOCUMENTS

| | | | | |
|---|---|---|---|---|
| 1,159,566 A | * | 11/1915 | Brigel ........................ | 137/865 |
| 3,220,212 A | * | 11/1965 | Fordsmand .................. | 62/288 |
| 5,226,454 A | * | 7/1993 | Cabalfin ..................... | 137/870 |
| 6,058,726 A | * | 5/2000 | Noritake ..................... | 137/870 |

* cited by examiner

*Primary Examiner*—Stephen M. Hepperle
(74) *Attorney, Agent, or Firm*—Hogan & Hartson, LLP

(57) ABSTRACT

A damper device includes a first baffle capable of opening or closing a first opening portion by turning about its axis and a second baffle capable of opening or closing a second opening portion by turning about its axis. A common drive source for driving the first baffle and the second baffle and a gear train by which the output from the drive source is transmitted to the first baffle and the second baffle are also provided. The device also includes a first rotary shaft driven by the gear train for driving the first baffle and a second rotary shaft driven by the gear train for driving the second baffle. The first rotary shaft and the second rotary shaft are arranged to be extended from the positions adjacent to each other on the gear train toward one side in an axial direction of the gear train.

17 Claims, 7 Drawing Sheets

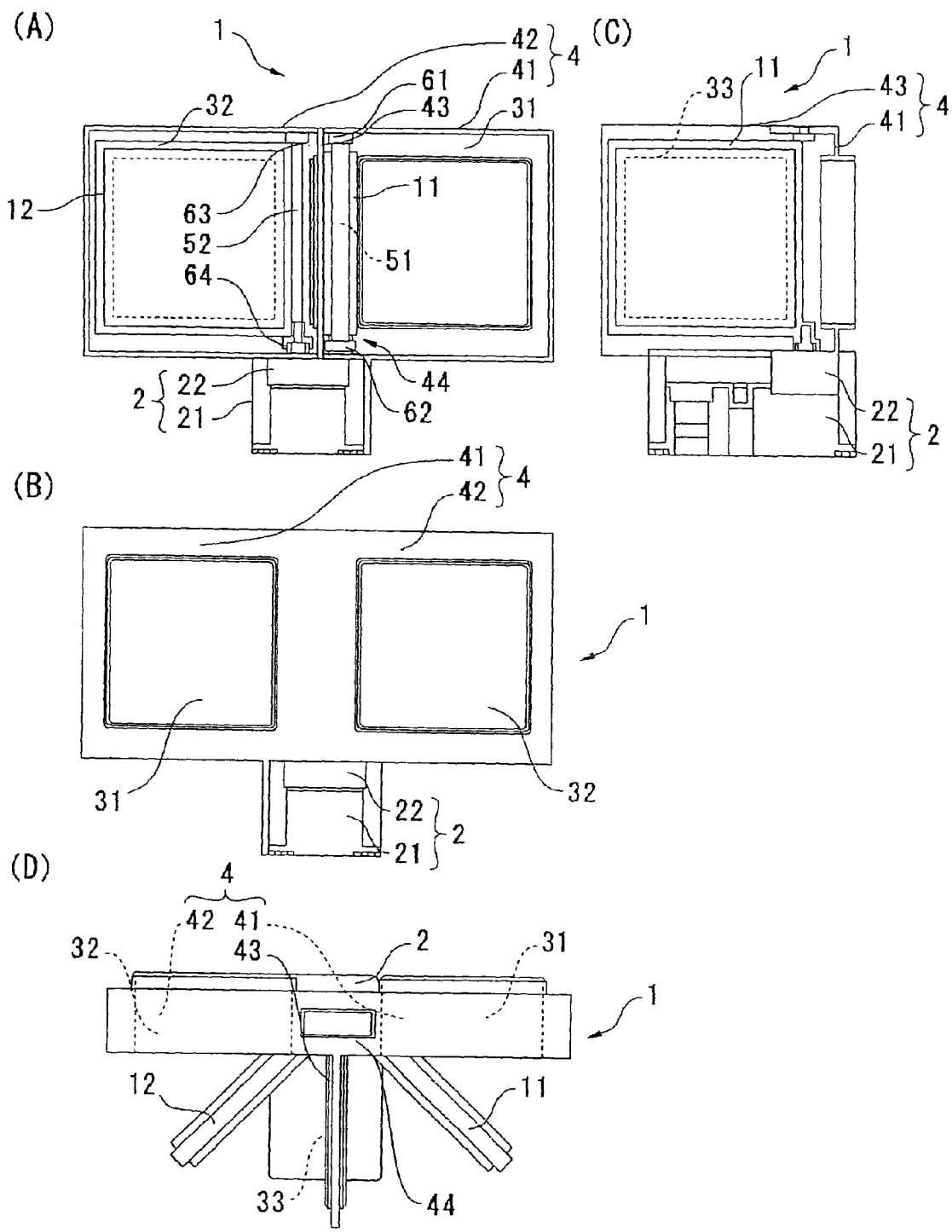
[FIG. 1]

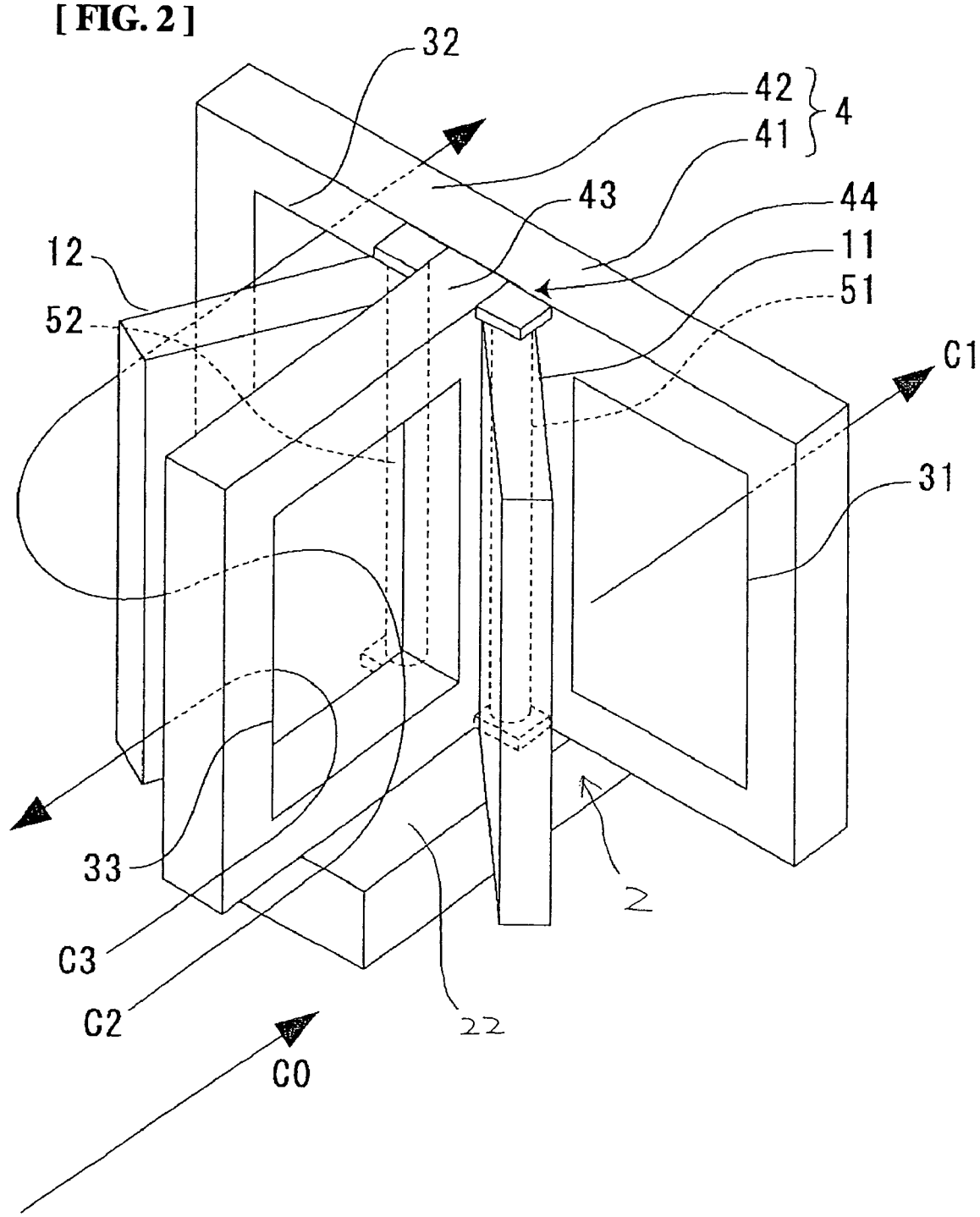
[FIG. 2]

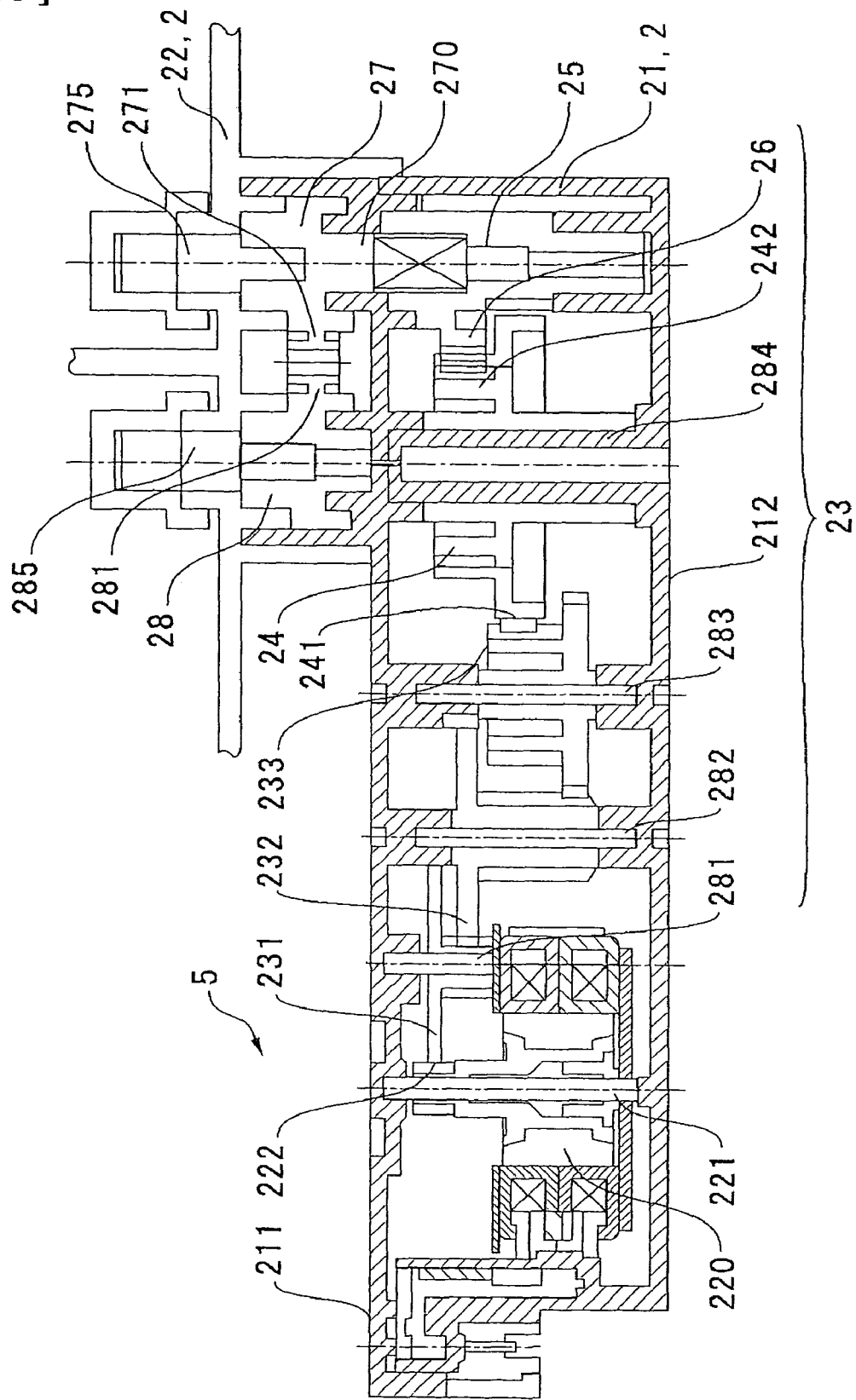
[FIG. 3]

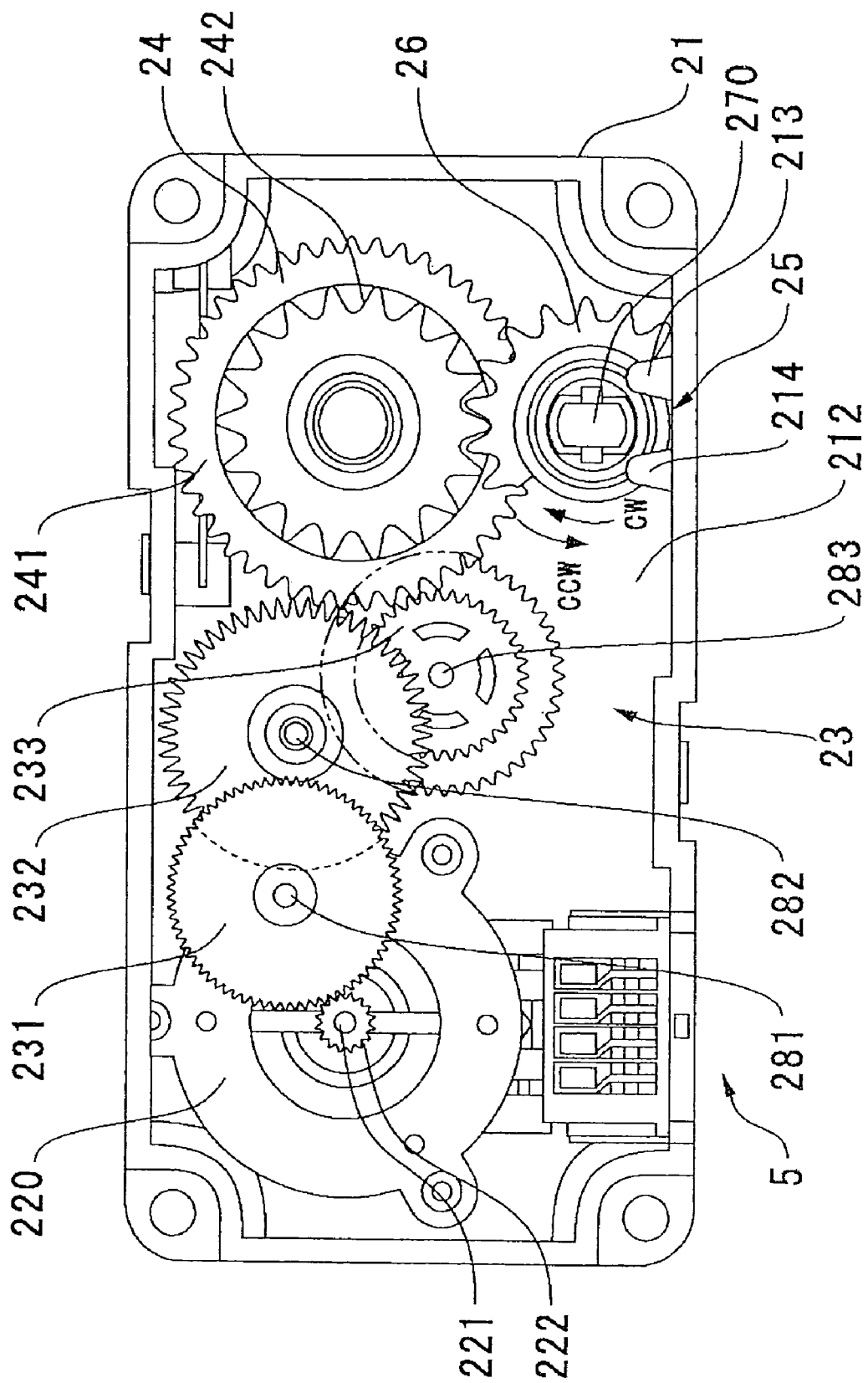
[FIG. 4]

[ FIG. 5 ]
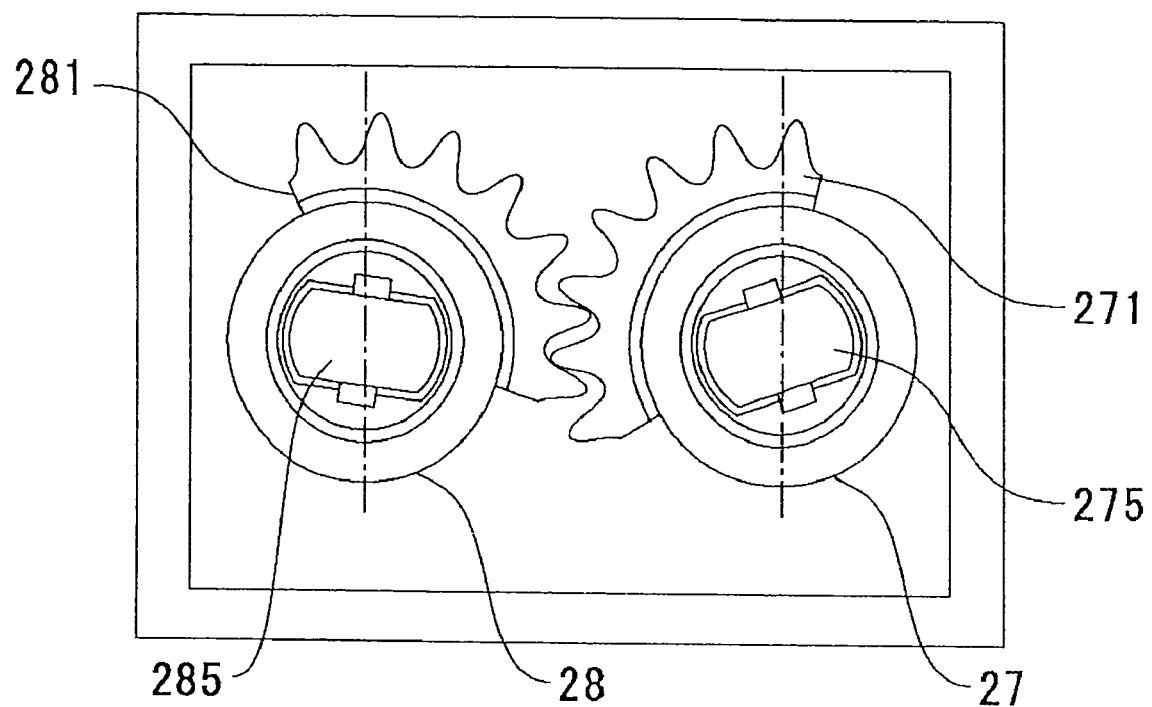

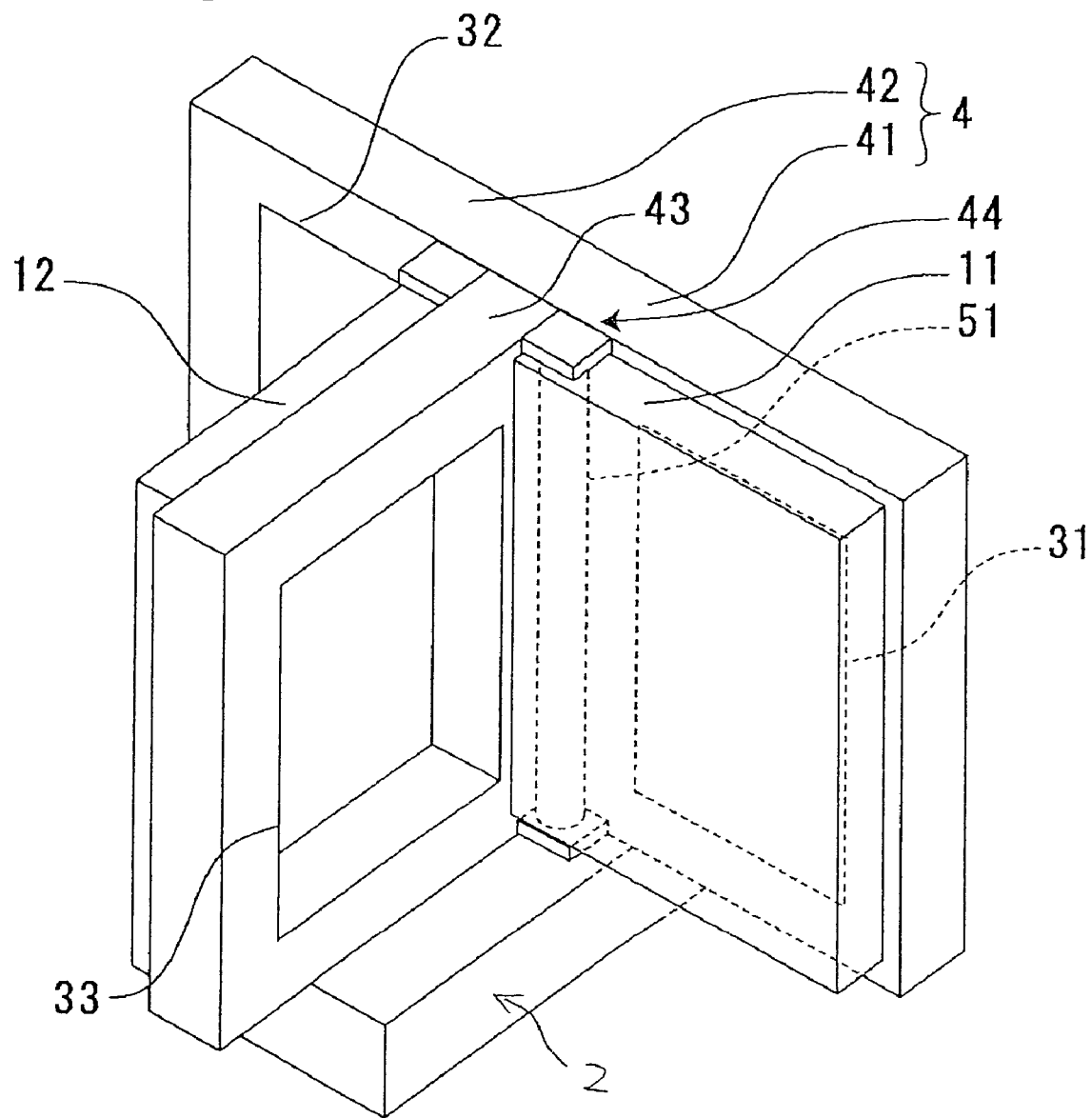
[FIG. 6]

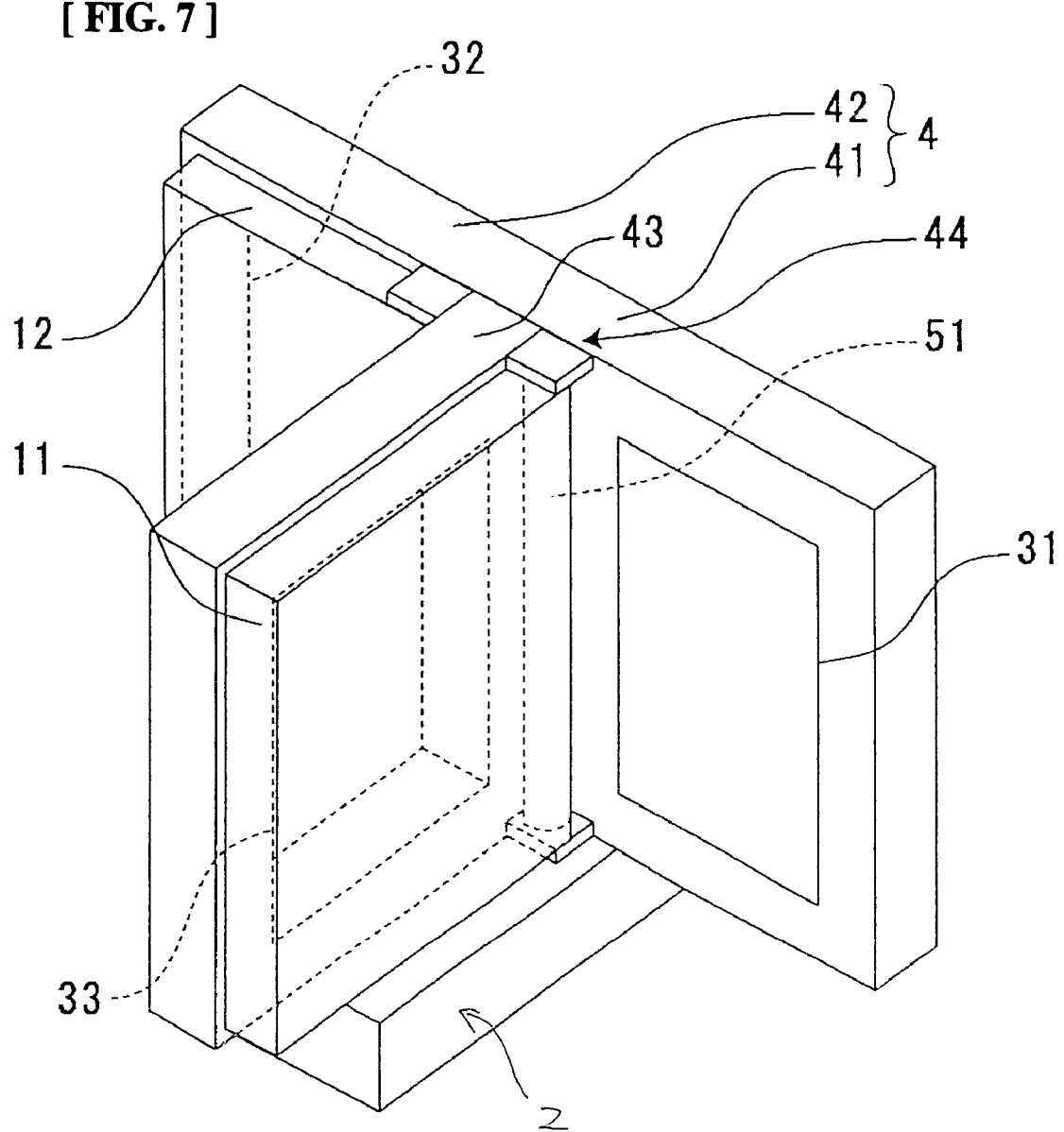
[FIG. 7]

DAMPER DEVICE

BACKGROUND OF THE INVENTION

1. Field of the Invention

The present invention relates to a damper device capable of selecting a flow passage by opening or closing an opening portion, through which a fluid passes, with a baffle.

2. Description of Related Art

Twin type damper devices having two baffles for two opening portions are used as conventional motor-driven type damper devices for refrigerators or the like. In order to drive these two baffles, a conventional damper device is constituted in such a manner that a gear train connected to a motor, which is a driving source, is provided with an output gear having two rotary shafts extended on both sides in an axial direction. The two baffles are driven by the respective rotary shafts.

In the conventional damper device, since the gear train includes two rotary shafts for two baffles extended on both sides in the axial direction, the gear train is positioned between the two baffles. That is the gear train is positioned between two opening portions. Therefore, respective flow passages communicating with the respective opening portions are arranged to be at considerable separated positions and thus downsizing of a refrigerator can not be attained.

Also, when the refrigerator is provided with a freezing compartment, a cooling compartment and a vegetable compartment, three opening portions communicating with a common cooled-air supply passage are required to be selectively supplied with a cooled air based on a prescribed timing. In this case, it is also difficult to attain the downsizing of the refrigerator because the refrigerator is provided with three baffles.

SUMMARY OF THE INVENTION

In view of the problems described above, it is advantage of the present invention to provide a downsized damper device by means of improving a baffle drive mechanism.

Also, it is another advantage of the present invention to provide a damper device capable of controlling opening/closing of three opening portions using two baffles.

In accordance with an embodiment of the present invention, there is provided a damper device including a first baffle capable of opening or closing a first opening portion by turning about its own axis, a second baffle capable of opening or closing a second opening portion by turning about its own axis, and a baffle drive means for driving the first baffle and the second baffle. The baffle drive means includes a common drive source for driving the first baffle and the second baffle and a gear train by which the output from the drive source is transmitted to the first baffle and the second baffle. A first rotary shaft which drives the first baffle and a second rotary shaft which drives the second baffle are arranged to be extended from the positions adjacent to each other on the gear train toward one side in an axial direction of the gear train.

According to such a damper device, since two rotary shafts for the first and second baffles are arranged to be extended from the positions adjacent to each other on the gear train toward the one side in the axial direction of the gear train, the two baffles and the two opening portions for the two baffles can be adjacently arranged on the one side of the gear train. Therefore, since flow passages communicating with the first opening portion and the second opening portion can be disposed in a close relation, downsizing of a refrigerator can be attained.

In accordance with an embodiment of the present invention, there is provided a damper device preferably including a third opening portion, one face side of which is closed by the first baffle when the first baffle is turned so as to open the first opening portion. According to the embodiment, when a refrigerator is provided with a freezing compartment, a cooling compartment and a vegetable compartment, and when the respective compartments are required to be independently supplied with cool air based on a prescribed timing, the first baffle is able to control opening/closing of the first opening portion and the third opening portion. Therefore, two baffles can control three opening portions and thus a refrigerator can be made smaller.

In this case, it is preferable to constitute the damper device in such a manner that the other face side of the third opening portion is closed by the second baffle when the second baffle is turned so as to open the second opening portion. According to the embodiment, since both of the first baffle and the second baffle are able to control opening/closing of the third opening portion, supplying cooled air to the respective compartments in a refrigerator can be finely controlled.

Preferably, a partition portion having the third opening portion is arranged at a position which substantially equally divides the angle formed by the closed face of the first opening portion and the closed face of the second opening portion. As constituted above, when the first opening portion changes from the CLOSED state to the OPENED state, the second opening portion can change from the OPENED state to the CLOSED state and at the same time the third opening portion can change to the CLOSED state by the first baffle. In addition, when the second opening portion changes from the CLOSED state to the OPENED state, the first opening portion can change from the OPENED state to the CLOSED state and at the same time the third opening portion can change to the CLOSED state by the second baffle.

Preferably, in accordance with an embodiment of the present invention, the common drive source of the baffle drive means is a stepping motor capable of rotating in both directions in order that the first baffle and the second baffle can move in the open direction or the close direction. When the stepping motor is used as the common drive source, the opening positions of the first baffle and the second baffle can be finely controlled as well as completely opening or completely closing the opening portions. Therefore, fine flow control of the cool air can be attained.

Preferably, in accordance with an embodiment of the present invention, a buffer member is provided on either side of surrounding parts of the respective opening portions or the respective baffles in order to ensure air tightness when the respective baffles close the respective opening portions.

Other features and advantages of the invention will be apparent from the following detailed description, taken in conjunction with the accompanying drawings that illustrate, by way of example, various features of embodiments of the invention.

BRIEF DESCRIPTION OF DRAWINGS

FIGS. 1(A), 1(B), 1(C) and 1(D) are respectively a front view, a rear view, a side view and a plan view of a motor-driven type damper device in accordance with an embodiment of the present invention.

FIG. 2 is an explanatory view of opening portions and baffles provided in the damper device shown in FIG. 1.

FIG. 3 is a cross-sectional view of an entire baffle drive mechanism used in the damper device shown in FIG. 1.

FIG. 4 is a plan view of gears of a first stage and a middle stage constituting a gear train used in the baffle drive mechanism, which is used in the damper device shown in FIG. 1.

FIG. 5 is a plan view of gears constituting a final stage of the gear train used in the baffle drive mechanism, which is used in the damper device shown in FIG. 1.

FIG. 6 is an explanatory view in which a first opening portion, a second opening portion and a third opening portion are respectively changed to a CLOSE state, an OPEN state and a CLOSE state from the state shown in FIG. 2.

FIG. 7 is an explanatory view in which the first opening portion, the second opening portion and the third opening portion are respectively changed to an OPEN state, a CLOSE state and a CLOSE state from the state shown in FIG. 2.

DETAILED DESCRIPTION OF THE PREFERRED EMBODIMENTS

Preferred embodiments of the present invention will be described in detail below with reference to the accompanying drawings.

(Damper Device)

FIGS. 1(A), 1(B), 1(C) and 1(D) are respectively a front view, a rear view, a side view and a plan view of a motor-driven type damper device in accordance with an embodiment of the present invention. FIG. 2 is an explanatory view of opening portions and baffles provided in the damper device according to the embodiment. FIG. 3 is a cross-sectional view of an entire baffle drive mechanism used in the damper device according to the embodiment. FIG. 4 is a plan view of gears of a first stage and a middle stage constituting a gear train used in the baffle drive mechanism. FIG. 5 is a plan view of gears constituting a final stage of the gear train used in the baffle drive mechanism.

In FIGS. 1 and 2, a motor-driven type damper device 1 in accordance with an embodiment of the present invention is used in a refrigerator for supplying cool air from a cool air supply source to a freezing compartment, a cooling compartment and a vegetable compartment respectively at prescribed timings.

In the motor-driven type damper device 1, a T-shaped frame 4 in plan view as shown in FIG. 1(D) is arranged on the top face of a case 2, in which a baffle drive mechanism described later is disposed inside. A first rectangular opening portion 31 and a second rectangular opening portion 32 are respectively formed in a first partition portion 41 and a second partition portion 42, which are respectively formed in the frame 4 at right and left sides in the front view as shown in FIG. 1(A). The frame 4 is formed in a T-shape in plan view and a third opening portion 31 is formed in a third partition portion 43 that extend from a boundary portion 44 between the first partition portion 41 and the second partition portion 42 in a perpendicular direction.

On the boundary portion 44 between the first partition portion 41 and the second partition portion 42, a first rotary shaft 51 and a second rotary shaft 52 are rotatably supported with bearings 61, 62, 63 and 64 at upper and lower ends on either side of the root portion of the third partition portion 43. A first baffle 11 made from a synthetic resin is coupled to the first rotary shaft 51 and a second baffle 12 made from a synthetic resin is coupled to the second rotary shaft 52.

A buffer member such as foamed polyethylene, rubber material and soft tape is adhered either on the periphery of the respective opening portions 31, 32 and 33 or on the baffles 11 and 12. An airtight state is ensured by the buffer member when the baffles 11 and 12 close the respective opening portions 31, 32 and 33.

In the motor-driven type damper device 1 of the present embodiment, the case 2 includes a lower resin case 21 and an upper resin case 22. The lower resin case 21 receives, as shown in FIGS. 3 and 4, respective members constituting of the baffle drive mechanism 5, in other words, a stepping motor 220, which is a driving source capable of rotating in both directions, and the major part of the gear train 23 for decelerating the rotation of the stepping motor 220 and transmitting to the first baffle 11 and the second baffle 12. A first driven gear 27 and a second driven gear 28 of the gear train 23 are arranged in the upper resin case 22.

The lower resin case 21 is formed in a rectangular box shape having side face parts 211 and 212. A rotation center shaft 221 of the stepping motor 220 and a plurality of fixed shafts 281, 282, 283 and 284 are arranged between the side face part 211 and the side face part 212.

The fixed shaft 281 is a metal shaft fixed between a case plate of the stepping motor 220 and the side face part 211 of the lower resin case 21. The fixed shafts 282 and 283 are metal shafts fixed in the side face parts 211 and 212 of the lower resin case 21. The fixed shaft 284 is a resin shaft, which is integrally formed with the side face part 212 of the lower resin case 21.

A first reduction gear 231, a second reduction gear 232 and a third reduction gear 233 of the gear train 23 are rotatably supported by the fixed shafts 281, 282 and 283 respectively. A driving gear 24 is rotatably supported by the fixed shaft 284.

The stepping motor 220 is a common driving source, which can rotate in both directions, for driving the first baffle 11 and the second baffle 12 in an open direction or in a close direction. The rotation of a pinion 222 mounted on the rotation center shaft 221 is transmitted to the driving gear 24 through the first reduction gear 231, the second reduction gear 232 and the third reduction gear 233.

The driving gear 24 is provided with a driven gear teeth part 241, where a gear is formed all over an outer periphery so that the rotation of the third reduction gear 233 is transmitted to the driven gear teeth part 241, and a feeding gear teeth part 242 on an upper side of the driven gear teeth part 241 in the axial direction for feeding a relay gear 25.

The relay gear 25 is provided with a sector gear 26 in an integral manner and the sector gear 26 is engaged with the feeding gear teeth part 242 of the driving gear 24. A first protruding part 213 is formed so as to be protruded from the lower case 21 ahead of the position where the relay gear 25 is to stop when the relay gear 25 rotates in a clockwise (CW) direction. The protruding part 213 prevents the sector gear 26 from further rotating over the stop position. A second protruding part 214 also protrudes from the lower resin case 21 ahead the position where the relay gear 25 stops when the relay gear 25 rotates in a counterclockwise (CCW) direction. The protruding part 214 serves as a stopper to prevent the sector gear 26 from further rotating over the stop position.

A rotary shaft 270 of a first driven gear 27 rotatably supported in the upper resin case 22 is coupled to the relay gear 25 so that the first driven gear 27 can be integrally rotated with the relay gear 25. A sector gear 271 is integrally formed in the first driven gear 27 and meshed with a sector gear 281, which is integrally formed in the second driven gear 28 that is arranged on one side of the first driven gear 27. Therefore, the second driven gear 28 can rotate with the relay gear 25 through the first driven gear 27 in an integral manner.

As shown in FIGS. 3 and 5, the upper face part of the first driven gear 27 is formed as a rotation output part 275, which is coupled to the first rotary shaft 51 extended in the upward direction, which is connected to the first baffle 11. Therefore, the first baffle 11 rotates by the first rotary shaft 51, which rotates by the rotation output part 275 of the first driven gear 27. The upper face part of the second driven gear 28 is formed as a rotation output part 285, which is coupled to the second rotary shaft 52 extended in the upward direction, which is connected with the second baffle 11. Therefore, the second baffle 12 is rotated by the rotation output part 285 of the second driven gear 28 through the second rotary shaft 52.

In FIG. 5, the rotation direction of the first rotary shaft 51 or the rotation direction of the first baffle 11 based on the rotation output part 275 of the first driven gear 27 is opposite to the rotation direction of the second rotary shaft 52 or the rotation direction of the second baffle 12 based on the rotation output part 285 of the second driven gear 28. Therefore, the first driven gear 27 and the second driven gear 28 are directly coupled to each other as shown in FIG. 5 when the first baffle 11 and the second baffle 12 operate so as to turn in the opposite direction together.

On the other hand, when the first baffle 11 and the second baffle 12 operate so as to turn in the same direction together, the rotation of the sector gear 271 of the first driven gear 27 is transmitted to the sector gear 281 of the second driven gear 28 through another relay gear. In this case, the first baffle 11 and the second baffle 12 can be easily turned in the same rotation direction together. Even when the rotation of the sector gear 271 is transmitted to the sector gear 281 through another relay gear, the first rotary shaft 51 and the second rotary shaft 52 for the first baffle 11 and the second baffle 12 can be easily disposed so as to extend from the positions adjacent to each other in a parallel relation on the gear train 23 toward the upper side in an axial direction of the gear train 23.

As described above, in the present embodiment, the first rotary shaft 51 for driving the first baffle 11 and the second rotary shaft 52 for driving the second baffle 12 are arranged so as to extend from the positions adjacent to each other on the gear train 23 toward one side (upper side) in an axial direction of the gear train 23.

(Operation of Damper Device)

FIG. 6 is an explanatory view in which the first opening portion 31, the second opening portion 32 and the third opening portion 33 are respectively in a CLOSED state, an OPENED state and a CLOSED state in the motor-driven type damper device 1 in accordance with the embodiment of the present invention. FIG. 7 is an explanatory view in which the first opening portion 31, the second opening portion 32 and the third opening portion 33 are respectively in an OPENED state, a CLOSED state and a CLOSED state in the motor-driven type damper device 1 in accordance with the embodiment of the present invention.

The motor-driven type damper device 1 of the present embodiment is constituted so that, for example, as shown in FIG. 2, a cool air is supplied through a cooled air supply passage as shown by the arrow C0, and the cool air can be introduced to a freezing compartment through the first opening portion 31 as shown by the arrow C1, to a vegetable compartment through the third opening portion 33 with the second opening portion 32 shown by the arrow C2 or to a cooling compartment through the third opening portion 33 shown by the arrow C3. In the description of the embodiment, the face of the third opening portion 33 where the first baffle 11 can close is referred to as one side of the third opening portion 33, and the other face where the second baffle 12 can close is referred to as the other side of the third opening portion 33.

In such a refrigerator as constituted above, for example, when the stepping motor 220 in the motor-driven type damper device 1 rotates in a clockwise direction, the rotation is transmitted to the first driven gear 27 of the gear train 23 and further transmitted to the first rotary shaft 51. Also, the rotation of the first driven gear 27 is transmitted to the second rotary shaft 52 through the second driven gear 28. Consequently, for example, as shown in FIG. 6, when the first opening portion 31 is closed by the first baffle 11 and the above-mentioned other side of the third opening portion 33 is closed by the second baffle 12, the cool air is completely shut off. This state can be held by a detent torque of the stepping motor 220.

On the other hand, when the stepping motor 220 rotates in a counterclockwise direction from the state shown in FIG. 2, the rotation is transmitted to the first driven gear 27 of the gear train 23 and further transmitted to the first rotary shaft 51. Also, the rotation of the first driven gear 27 is transmitted to the second rotary shaft 52 through the second driven gear 28. Consequently, as shown in FIG. 7, the first opening portion 31 becomes in a completely opened state for supplying the cool air to the freezing compartment, and the above-mentioned one side of the third opening portion 33 is closed by the first baffle 11 and the supply of the cool air to the vegetable compartment or the cooling compartment is prevented. This state is also held by the detent torque of the stepping motor 220.

When the first baffle 11 and the second baffle 12 are stopped at intermediate positions from the state shown in FIG. 2 to the state shown in FIG. 6 or at intermediate positions from the state shown in FIG. 2 to the state shown in FIG. 7, the supplying or flowing amounts of the cool air to the freezing, vegetable or cooling compartments can be controlled by their stopped positions.

In the motor-driven type damper device 1 according to the above mentioned embodiment, as shown in FIG. 2, a cool air is supplied from the cooled air supply passage as shown by the arrow C0. However, it can be easily modified and capable of selecting how the motor-driven type damper device 1 is arranged with respect to the cooled air supply source and how the cool air is passed through.

(Principal Effects of the Embodiment)

In the embodiments of the present invention, as described above, the first rotary shaft 51 for the first baffle 11 and the second rotary shaft 52 for the second baffle 12 are provided so as to extend in a parallel manner from the positions adjacent to each other on the gear train 23 toward one side (upper side) in an axial direction of the gear train 23. Therefore, it is not necessary to have a disposing space for arranging the gear train 23 between the two baffles 11 and 12 (between the two opening portions 31 and 32) and thus the two baffles 11 and 12 and the two opening portions 31 and 32 can be arranged in a close relation on one side (only upper side) of the gear train 23. Accordingly, since the flow passages communicating with the first opening portion 31 and the second opening portion 32 can be arranged so as to be positioned close to each other, the refrigerator can be made smaller.

Also, in the present embodiment, since the first baffle 11 can control the opening/closing of the first opening portion 31 and the third opening portion 33, the two baffles 11 and 12 can control and deal with the opening/closing of the three opening portions 33, 32 and 33. Therefore the refrigerator can be made smaller. Moreover, since the second baffle 12 can also control the opening/closing of the second opening portion 32 and the third opening portion 33, the supply of the cool air to the respective compartments in the refrigerator can be precisely controlled.

Also, the third partition portion 43 provided with the third opening portion 33 is arranged at a position which substantially equally divides the angle formed by the planes, that is, the face to be closed of the first opening portion 31 and the face to be closed of the second opening portion 32. Further, since the second driven gear 28 rotates by the first driven gear 27, the first baffle 11 is interlocked with the second baffle 12. Therefore, when the first opening portion 31 changes from a CLOSED state to an OPENED state, the second opening portion 32 can change from an OPENED state to a CLOSED state and the third opening portion 33 can change to a CLOSED state by the first baffle 11. Besides, when the second opening portion 32 changes from the CLOSED state to the OPENED state, the first opening portion 31 can change from the OPENED state to the CLOSED state and the third opening portion 33 can change the closed state by the second baffle 12.

(Another Embodiments)

In the above-mentioned embodiments, three opening portions 31, 32 and 33 are arranged in a T-shaped frame, but the T-shaped frame can be modified in such a manner that the angle defined by the first opening portion 31 and the third opening portion 33 is different from the angle defined by the second opening portion 32 and the third opening portion 33.

Also, in the above-mentioned embodiments, the first partition portion 41 and the second partition portion 42 are formed like a straight plane in which the angle defined by the first partition portion 41 and the second partition portion 42 is 180 degrees. However, the angle defined by the first partition portion 41 and the second partition portion 42 can be modified less than 180 degrees or more than 180 degrees.

As described above, in the damper device according to the present invention, since two rotary shafts for the first and second baffles are arranged to be extended from the positions adjacent to each other on the gear train toward the one side in the axial direction of the gear train, the two baffles and the two openings for the two baffles can be adjacently arranged on the one side of the gear train. Consequently, the flow passages communicating with the first opening portion and the second opening portion can be disposed in a close relation, and therefore, reducing the size of the refrigerator.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A damper device comprising:
    a first baffle capable of opening or closing a first opening portion by turning about its axis;
    a second baffle capable of opening or closing a second opening portion by turning about its axis;
    a common drive source for driving the first baffle and the second baffle and a gear train by which the output from the drive source is transmitted to the first baffle and the second baffle;
    a first rotary shaft driven by the gear train for driving the first baffle; and
    a second rotary shaft driven by the gear train for driving the second baffle,
    wherein the first rotary shaft and the second rotary shaft are arranged to be extended from positions adjacent to each other on the gear train toward one side in an axial direction of the gear train, and
    wherein the first baffle closes one side of a third opening portion when the first baffle is turned so as to open the first opening portion.

2. The damper device according to claim 1, wherein the second baffle closes the other side of the third opening portion when the second baffle is turned so as to open the first opening portion.

3. The damper device according to claim 2, further comprising a partition portion provided with the third opening portion and arranged at a position which substantially equally divides an angle formed by a closed face of the first opening portion and a closed face of the second opening portion.

4. A damper device comprising:
    a first baffle capable of opening or closing a first opening portion by turning about its axis;
    a second baffle capable of opening or closing a second opening portion by turning about its axis;
    a common drive source for driving the first baffle and the second baffle and a gear train by which the output from the drive source is transmitted to the first baffle and the second baffle;
    a first rotary shaft driven by the near train for driving the first baffle;
    a second rotary shaft driven by the gear train for driving the second baffle,
    wherein the first rotary shaft and the second rotary shaft are arranged to be extended from positions adjacent to each other on the gear train toward one side in an axial direction of the gear train;
    a case, in which the common drive source and gear grain are disposed inside, and
    a frame having a first partition portion provided with the first opening portion, a second partition portion provided with the second opening portion, and a third partition portion provided with a third opening portion,
    wherein the first partition portion and the second partition portion are respectively formed so as to extend on right and left sides, and the third partition portion are extended from a boundary portion between the first partition portion and the second partition portion.

5. The damper device according to claim 4, wherein the first rotary shaft and the second rotary shaft are respectively rotatably supported on either side of a root portion of the third partition portion.

6. The damper device according to claim 5, wherein the common drive source is a stepping motor capable of rotating in both directions to turn the first baffle and the second baffle in the open direction or the close direction.

7. The damper device according to claim 6, further comprising:
   at least one reduction gear;
   a driving gear rotated by the reduction gear; and
   two sector gears turned by the driving gear, and the two sector gears respectively turn the first rotary shaft and the second rotary shaft.

8. The damper device according to claim 4, further comprising buffer members provided on either side of surrounding parts of respective openings or respective baffles in order to ensure air tightness when respective baffles close respective opening portions.

9. A damper device comprising:
   a first baffle capable of opening or closing a first opening portion by turning about its axis;
   a second baffle capable of opening or closing a second opening portion by turning about its axis;
   means for driving the first baffle and second baffle;
   a common drive source for driving the first baffle and the second baffle and a gear train by which the output from the drive source is transmitted to the first baffle and the second baffle;
   a first rotary shaft driven by the gear train for driving the first baffle; and
   a second rotary shaft driven by the gear train for driving the second baffle,
   wherein the first rotary shaft and the second rotary shaft are arranged to be extended from positions adjacent to each other on the gear train toward one side in an axial direction of the gear train, and
   wherein the first baffle closes one side of a third opening portion when the first baffle is turned so as to open the first opening portion.

10. The damper device according to claim 9, wherein the second baffle closes the other side of the third opening portion when the second baffle is turned so as to open the first opening portion.

11. The damper device according to claim 10, further comprising a partition portion provided with the third opening portion and arranged at a position which substantially equally divides an angle formed by a closed face of the first opening portion and a closed face of the second opening portion.

12. A damper device comprising:
   a first baffle capable of opening or closing a first opening portion by turning about its axis;
   a second baffle capable of opening or closing a second opening portion by turning about its axis;
   means for driving the first baffle and second baffle;
   a common drive source for driving the first baffle and the second baffle and a gear train by which the output from the drive source is transmitted to the first baffle and the second baffle;
   a first rotary shaft driven by the gear train for driving the first baffle;
   a second rotary shaft driven by the gear train for driving the second baffle,
   wherein the first rotary shaft and the second rotary shaft are arranged to be extended from positions adjacent to each other on the sear train toward one side in an axial direction of the gear train;
   a case, in which the means for driving is disposed inside; and
   a frame having a first partition portion provided with the first opening portion, a second partition portion provided with the second opening portion, and a third partition portion provided with a third opening portion,
   wherein the first partition portion and the second partition portion are respectively formed so as to extend on right and left sides, and the third partition portion are extended from a boundary portion between the first partition portion and the second partition portion.

13. The damper device according to claim 12, wherein the first rotary shaft and the second rotary shaft are respectively rotatably supported on either side of a root portion of the third partition portion.

14. The damper device according to claim 13, wherein the common drive source is a stepping motor capable of rotating in both directions to turn the first baffle and the second baffle in the open direction or the close direction.

15. The damper device according to claim 14, wherein the means for driving includes at least one reduction gear, a driving gear rotated by the reduction gear, and two sector gears turned by the driving gear, and the two sector gears respectively turn the first rotary shaft and the second rotary shaft.

16. The damper device according to claim 12, further comprising buffer members provided on either side of surrounding parts of respective openings or respective baffles in order to ensure air tightness when respective baffles close respective opening portions.

17. A method for creating a damming effect comprising:
   opening or closing a first opening portion
   opening or closing a second opening portion
   driving a first baffle by a first rotary shaft driven by a gear train;
   driving a second baffle by a second rotary shaft driven by the gear train;
   arranging the first rotary shaft and the second rotary shaft to be extended from positions adjacent to each other on the gear train toward one side in an axial direction of the gear train; and
   closing one side of a third opening portion when the first baffle is turned so as to open the first opening portion.

* * * * *